US006858295B2

(12) United States Patent
Diehl et al.

(10) Patent No.: US 6,858,295 B2
(45) Date of Patent: Feb. 22, 2005

(54) PRESSURE SENSITIVE ADHESIVE COMPRISING VINYLPYRROLIDONE

(75) Inventors: Heiko Diehl, St. Martin (DE); Karl-Heinz Schumacher, Neustadt (DE); Ralf Fink, Schifferstadt (DE); Martin Jung, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 128 days.

(21) Appl. No.: 10/326,391

(22) Filed: Dec. 23, 2002

(65) Prior Publication Data

US 2003/0153642 A1 Aug. 14, 2003

(30) Foreign Application Priority Data

Jan. 22, 2002 (DE) ......................................... 102 02 446

(51) Int. Cl.$^7$ .............................. B32B 7/12; C09J 4/00; C09J 101/00; C09J 201/00; C08L 33/00
(52) U.S. Cl. ............ 428/343; 428/355 R; 428/355 EN; 428/355 CN; 156/327; 156/330.9; 156/331.5; 525/217; 525/223
(58) Field of Search .............................. 428/343, 355 R, 428/355 EN, 355 CN; 156/327, 330.9, 331.5; 525/217, 223

(56) References Cited

U.S. PATENT DOCUMENTS

| 4,181,752 A | | 1/1980 | Martens et al. | |
| 4,364,972 A | | 12/1982 | Moon | |
| 5,639,811 A | * | 6/1997 | Plamthottam et al. | ...... 524/272 |
| 6,235,363 B1 | * | 5/2001 | Bilodeau | ................... 428/40.1 |

FOREIGN PATENT DOCUMENTS

| EP | 0 357 204 | * | 3/1990 |
| EP | 0 437 068 | | 7/1991 |
| WO | WO 91/04151 | | 4/1991 |

* cited by examiner

Primary Examiner—Nathan M. Nutter
(74) Attorney, Agent, or Firm—Oblon, Spivak, McClelland, Maier & Neustadt, P.C.

(57) ABSTRACT

A pressure sensitive adhesive comprising a mixture of:
a radiation-crosslinkable polymer A) composed of at least 40% by weight of $C_1$ to $C_{18}$ alkyl (meth)acrylates, and a polymer B) composed of at least 20% by weight of vinylpyrrolidone and of less than 40% by weight of $C_1$ to $C_{18}$ alkyl (meth)acrylates, wherein the fraction of the polymer B) in the mixture is less than 15% by weight, based on the sum of A)+B).

17 Claims, No Drawings

PRESSURE SENSITIVE ADHESIVE COMPRISING VINYLPYRROLIDONE

BACKGROUND OF THE INVENTION

Field of the Invention

The invention relates to a pressure sensitive adhesive comprising a mixture of a radiation-crosslinkable polymer A) composed of at least 40% by weight of C1 to C18 alkyl (meth)acrylates and a polymer B) composed of at least 20% by weight of vinylpyrrolidone and of less than 40% by weight of C1 to C18 alkyl (meth)acrylates or a pressure sensitive adhesive comprising a radiation-crosslinkable polymer C) composed of at least 40% by weight of C1 to C18 alkyl (meth)acrylates and comprising vinylpyrrolidone as comonomer, the fraction of the polymer B) in the mixture being less than 15% by weight, based on the sum of A)+B), and the amount of vinylpyrrolidone in the polymer C) being less than 15% by weight.

The invention further relates to a process for producing self-adhesive articles by means of this adhesive. With pressure sensitive adhesives (PSAs), here is a desire both for good adhesion (sticking) to the substrate and for sufficient internal strength in the adhesive film (cohesion).

DESCRIPTION OF THE BACKGROUND

In the case of radiation-crosslinkable PSAs, the cohesion is brought about after the adhesive has been coated onto a carrier, by means of subsequent, photochemically induced crosslinking.

Adhesion and cohesion are divergent performance properties. Measures which bring about an improvement in the adhesion are generally accompanied at the same time by a deterioration in the cohesion, and vice versa.

U.S. Pat. No. 4,364,972 discloses acrylate copolymers containing more than 15% vinylpyrrolidone, and their use as pressure sensitive adhesives. The k value, as a measure of the molecular weight, is greater than 100.

SUMMARY OF THE INVENTION

It is an object of the present invention to improve adhesion and cohesion or the adhesion/cohesion tradeoff.

This improvement is to be achieved, starting from the existing polyacrylate PSAs, by means of minimal modifications.

One particular objective is to improve the adhesion to apolar substances, such as polyolefins.

We have found that this object is achieved by the pressure sensitive adhesives defined at the outset and by a process for producing self-adhesive articles.

The invention provides two alternatives:

a pressure sensitive adhesive comprising polymers A) and B)

or as the alternative, a pressure sensitive adhesive comprising polymer C).

DETAILED DESCRIPTION OF THE PREFERRED EMBODIMENTS

Features common to the two alternatives include in particular the low vinylpyrrolidone content of less than 15% by weight.

Alternative 1: Polymer A) and B)

The polymer A) is composed of at least 40% by weight, preferably at least 60% by weight, with particular preference at least 80% by weight, of $C_1$–$C_{18}$ alkyl (meth)acrylates.

Mention may be made in particular of $C_1$–$C_8$ alkyl (meth)acrylates, e.g., methyl (meth)acrylate, ethyl (meth)acrylate, n-butyl (meth)acrylate, and 2-ethylhexyl (meth)acrylate.

The adhesive preferably includes a photoinitiator, so that polymer A) can be crosslinked with UV light. The photoinitiator is preferably attached to the polymer A).

By irradiation with high-energy light, especially UV light, the photoinitiator brings about crosslinking of the polymer, preferably by means of a chemical grafting reaction of the photoinitiator with a spatially adjacent polymer chain. Crosslinking may take place in particular by insertion of a carbonyl group of the photoinitiator into an adjacent C—H bond to form a —C—C—O—H group.

The adhesive contains preferably from 0.0001 to 1 mol, with particular preference from 0.0002 to 0.1, with very particular preference from 0.0003 to 0.01 mol, of the photoinitiator, or of the photoinitiator-active molecule group attached to the polymer, per 100 g of polymer A).

The photoinitiator comprises, for example, acetophenone, benzophenone, benzoin ethers, benzil dialkyl ketals or derivatives thereof.

The photoinitiator is preferably attached to the polyacrylate.

With particular preference the photoinitiator is one which is incorporated into the polymer chain by means of free-radical copolymerization. For this purpose the photoinitiator preferably contains an acrylic or (meth)acrylic group.

Suitable copolymerizable photoinitiators are acetophenone derivatives or benzophenone derivatives which contain at least one, preferably one, ethylenically unsaturated group. The ethylenically unsaturated group is preferably an acrylic or methacrylic group.

The ethylenically unsaturated group may be attached directly to the phenyl ring of the acetophenone or benzophenone derivative. In general there is a spacer group located between phenyl ring and ethylenically unsaturated group.

The spacer group may contain, for example, up to 100 carbon atoms.

Suitable acetophenone or benzophenone derivatives are described, for example, in EP-A-346 734, EP-A-377199 (1st claim), DE-A-4 037 079 (1st claim), and DE-A-3 844 444 (1st claim) and by this reference are hereby incorporated into the present specification. Preferred acetophenone and benzophenone derivatives are those of the formula

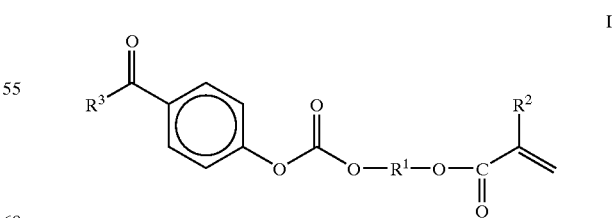

I in which $R^1$ stands for an organic radical having up to 30 carbon atoms, $R^2$ for a hydrogen atom or a methyl group, and $R^3$ for an unsubstituted or substituted phenyl group or a $C_1$–$C_4$ alkyl group.

$R^1$ stands with particular preference for an alkylene group, in particular for a $C_2$–$C_8$ alkylene group.

R³ stands with particular preference for a methyl group or a phenyl group.

Examples of further monomers of which the polymer A) may be composed are vinyl esters of carboxylic acids containing up to 20 carbon atoms, vinylaromatics having up to 20 carbon atoms, ethylenically unsaturated nitriles, vinyl halides, vinyl ethers of alcohols containing from 1 to 10 carbon atoms, aliphatic hydrocarbons having from 2 to 8 carbon atoms and 1 or 2 double bonds, or mixtures of these monomers.

Suitable vinyl esters include in particular vinyl propionate and, with particular preference, vinyl acetate.

Suitable vinylaromatic compounds include, for example, vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether, vinyl ethyl ether or vinyl isobutyl ether. Preferred vinylethers are those of alcohols containing from 1 to 4 carbon atoms.

As hydrocarbons having from 2 to 8 carbon atoms and two olefinic double bonds mention may be made of butadiene, isoprene, and chloroprene.

Further suitable monomers include in particular monomers containing carboxylic acid, sulfonic acid or phosphonic acid groups. Carboxylic acid groups are preferred. Examples that may be mentioned include acrylic acid, methacrylic acid, itaconic acid, maleic acid, and fumaric acid.

Further monomers are also, for example, hydroxyl-containing monomers, especially $C_1$–$C_{10}$ hydroxyalkyl (meth)acrylates, and also (meth)acrylamide.

Furthermore, mention may be made of phenyloxyethyl glycol mono(meth)acrylate, glycidyl acrylate, glycidyl methacrylate, and amino (meth)acrylates such as 2-aminoethyl (meth)acrylate.

Monomers which in addition to the double bond carry further functional groups as well, e.g., isocyanate, amino, hydroxyl, amide or glycidyl, may, for example, improve the substrate adhesion.

The polymer A) preferably has a K value of not more than 80, in particular from 30 to 80, with particular preference from 40 to 60, measured in tetrahydrofuran (1% strength solution, 21° C.).

The Fikentscher K value is a measure of the molecular weight and viscosity of a polymer.

The glass transition temperature (Tg) of the polymer A) is preferably from −60 to +10° C., with particular preference from −55 to 0° C., with very particular preference from −55 to −10° C.

The glass transition temperature of the polymer A) may be determined by customary methods such as differential thermoanalysis or differential scanning calorimetry (see, for example, ASTM 3418/82, midpoint temperature).

Polymers A) may be prepared by copolymerizing the monomeric components using the customary polymerization initiators and also, where appropriate, regulators, polymerization being carried out at the customary temperatures in bulk, in emulsion, e.g., in water or liquid hydrocarbons, or in solution. Emulsion polymerization produces aqueous dispersions of the polymer A). The polymers are preferably prepared by polymerization of the monomers in solvents (solution polymerization), in particular in solvents with a boiling range from 50 to 150° C., preferably from 60 to 120° C., using the customary amounts of polymerization initiators, which are generally from 0.01 to 10% by weight, in particular from 0.1 to 4% by weight, based on the total weight of the monomers. Suitable solvents include, in particular, alcohols, such as methanol, ethanol, n- and iso-propanol, n- and iso-butanol, preferably isopropanol and/or isobutanol, and also hydrocarbons such as toluene and, in particular, petroleum spirits with a boiling range from 60 to 120° C. It is also possible to use ketones, such as acetone, methyl ethyl ketone, and methyl isobutyl ketone, and esters, such as ethyl acetate, and also mixtures of solvents of the type mentioned, preference being given to mixtures containing isopropanol and/or isobutanol in amounts of from 5 to 95% by weight, in particular from 10 to 80% by weight, preferably from 25 to 60% by weight, based on the solvent mixture used.

In the case of solution polymerization, examples of suitable polymerization initiators include azo compounds, ketone peroxides, and alkyl peroxides.

Following polymerization in solution, the solvents may where appropriate be separated off under reduced pressure, operating at elevated temperatures in the range, for example, of from 100 to 150° C. The polymers may then be used in the solvent-free state, i.e., as melts. In some cases it is also of advantage to prepare the polymers by polymerization in bulk, i.e., without the use of a solvent, in which case it is possible to operate batchwise or else continuously, e.g., in accordance with the details in U.S. Pat. No. 4,042,768.

The polymers A) used in the mixture of the invention are preferably solvent-free. A residual amount of solvents, e.g., organic solvents and/or water, of below 5 parts by weight, in particular below 2 parts by weight, with particular preference below 1 part by weight, with very particular preference below 0.5 part by weight or below 0.1 part by weight, of solvent per 100 parts by weight of the sum of polymer A) and polymer B), can be present, however.

In addition to the polymer A), the mixture of the invention includes a polymer B) which is composed of at least 20% by weight of vinylpyrrolidone.

Polymer B) is preferably composed of at least 30% by weight, with very particular preference at least 50% by weight, of vinylpyrrolidone. By vinylpyrrolidone in this context is meant N-vinylpyrrolidone.

Examples of suitable further monomers include all of the monomers already listed above for polymer A). The further monomers preferably comprise vinyl esters of carboxylic acids containing up to 20 carbon atoms, in particular those of carboxylic acids containing up to 6 carbon atoms. Mention may be made in particular of vinyl propionate and, with very particular preference, of vinyl acetate.

The amount of the vinyl esters can be, for example, 0–80% by weight, in particular from 0 to 70% by weight, and with particular preference from 0 to 50% by weight, based on polymer B).

In one particular embodiment, a suitable vinyl ester content is from 30 to 70% by weight of vinyl esters, especially vinyl acetate.

The amount of vinylpyrrolidone and vinyl esters, especially vinyl acetate, together is in particular at least 60% by weight, preferably at least 80% by weight, and also in particular at least 90% by weight.

Other suitable further monomers include, for example, vinylimidazole and the other monomers mentioned under A). Polymer B) may also be radiation-crosslinkable. For this purpose polymer B) preferably includes the copolymerizable photoinitiators listed under A).

Polymer B) need not contain any $C_1$–$C_{18}$ alkyl (meth)acrylates. The $C_1$–$C_{18}$ alkyl (meth)acrylate content is therefore below 40% by weight, in particular below 20% by weight, with particular preference below 5% by weight or at 0% by weight.

Polymers B) are preferably prepared by free-radical polymerization, especially in a solvent (solution polymerization).

Examples of suitable solvents include water, alcohols or other polar organic solvents.

The polymer B) preferably has a K value of not more than 80, in particular from 10 to 70, with particular preference from 15 to 60, measured in tetrahydrofuran (1% strength solution, 21° C.).

The Fikentscher K value is a measure of the molecular weight and viscosity of the polymer.

Where polymer A) is in the form of an aqueous dispersion, polymer B) can simply be added.

In the preferred case where polymer A) has been obtained by solution polymerization in an organic solvent, polymer B) can simply be added to the solution and, if desired, the solvent can be removed subsequently.

This procedure results in particularly advantageous mixtures of the polymers A) and B).

The mixture of the polymers A) and B) and also the pressure sensitive adhesive are preferably free of water and solvent or contain at most the residual amounts, already indicated above, of less than 5 parts by weight, in particular less than 2 parts by weight; less than 1 part by weight, less than 0.5 part by weight, or less than 0.1 part by weight, of water and/or solvent per 100 parts by weight of the sum of A)+B).

The fraction of polymer B) is less than 15 parts by weight per 100 parts by weight of the sum of A)+B).

With preference, the amount of the polymer B) is from 0.1 to 14 parts by weight, with particular preference from 2 to 14 and very particular preference from 5 to 14 and in particular from 10 to 14 parts by weight, per 100 parts by weight of the sum of A)+B).

Alternative 2: Polymer C)

In this case the pressure sensitive adhesive includes a polymer C) comprising vinylpyrrolidone as comonomer.

For polymer C) and for the pressure sensitive adhesive comprising polymer C), the comments made above in relation to polymer A) and the pressure sensitive adhesive apply, unless indicated otherwise, in the remarks below.

The vinylpyrrolidone (i.e. N-vinylpyrrolidone) content of polymer C) is less than 15% by weight, based on polymer C). It is preferably from 2 to 14% by weight, with particular preference from 5 to 14% by weight, and with very particular preference from 10 to 14% by weight.

Polymer C) as well, like polymer A), is otherwise composed preferably of $C_1$–$C_{18}$ alkyl (meth)acrylates; in particular, the amount thereof in the polymer C) is at least 60% by weight and with particular preference at least 80% by weight.

As further monomers polymer C) may also contain vinyl esters, especially vinyl acetate.

Moreover, polymer C) is radiation-crosslinkable.

For this purpose the pressure sensitive adhesive preferably includes a photoinitiator; with particular preference, said photoinitiator is attached to the polymer C).

Regarding the nature and amount of the photoinitiator, the comments made above in connection with alternative 1 apply.

Polymer C) may further comprise the monomers specified for polymer A) as well.

Polymer C) preferably has a K value of not more than 80, in particular from 30 to 80, with particular preference from 40 to 60, measured in tetrahydrofuran (1% strength solution, 21° C.).

The Fikentscher K value is a measure of the molecular weight and viscosity of the polymer.

The glass transition temperature (Tg) of the Polymer C) is preferably from −60 to +10° C., with particular preference from −55 to 0° C., with very particular preference from −55 to −10° C. (Regarding the determination of the glass transition temperature, see above.)

The preparation takes place to correspond to polymer A); preferably, it is effected by solution polymerization and subsequent removal of the solvent. Polymer C) and also the pressure sensitive adhesive are preferably free of solvent and water and contain at most a residual content as indicated above for A).

In Relation to Both Alternatives

The PSAs of the invention may consist solely of the mixture of polymer A) and B) or, alternatively, solely of polymer C).

The PSAs may comprise further additives. Where photoinitiators are not already attached to polymer A) and/or C), they may be added to the PSAs at any desired point in time.

Examples of further additives include fillers, colorants, leveling assistants, and, in particular, tackifiers (tackifying resins).

Tackifiers are, for example, natural resins, such as rosins and their derivatives formed by disproportionation or isomerization, polymerization, dimerization, and/or hydrogenation. They may be in their salt form (with monovalent or polyvalent counterions, for example (cations) or, preferably, in their esterified form. Alcohols used for the esterification may be monohydric or polyhydric. Examples are methanol, ethanediol, diethylene glycol, triethylene glycol, 1,2,3-propanetriol, and pentaerythritol.

Use is also made, furthermore, of hydrocarbon resins, e.g., coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene.

Polyacrylates which have a low molar weight are also increasingly being used as tackifiers. These polyacrylates have a weight-average molecular weight $M_w$ of preferably less than 30,000. The polyacrylates are composed preferably of at least 60% by weight, in particular at least 80% by weight, of $C_1$–$C_8$ alkyl (meth)acrylates.

Preferred tackifiers are natural or chemically modified rosins. Rosins are composed predominantly of abietic acid or derivatives of abietic acid.

The amount by weight of the tackifiers is, for example, from 5 to 100 parts by weight, with particular preference from 10 to 50 parts by weight, per 100 parts by weight of polyacrylate (solids/solids).

These pressure sensitive adhesives are preferably used as hotmelt PSAs; that is, they are applied from the melt to the desired carriers.

The PSAs and hotmelt adhesives of the invention are particularly suitable for producing self-adhesive articles, such as labels, adhesive tapes or adhesive sheets, e.g., protective films.

The self-adhesive articles are generally composed of a carrier or backing and a film of the adhesive applied to one or both sides, preferably one side.

The backing material may comprise, for example, paper or a polymer film made from polyolefins or PVC.

The self-adhesive articles are produced in particular by applying the pressure sensitive adhesive to the backing and subsequently effecting crosslinking with UV light.

The self-adhesive articles are suitable for a very wide variety of substrates. The substrates may be of metals, paper, card, wood, plastics, etc.

It is a particular advantage of the invention that using the pressure sensitive adhesives of the invention very good adhesion is achieved by the self-adhesive articles even on apolar surfaces, particularly on surfaces of polyolefins, e.g., polyethylene or polypropylene.

In general, very good adhesion and cohesion are achieved.

EXAMPLES

Pressure Sensitive Adhesive 1 (PSA1)

This is a mixture of polyacrylate (polymer A)) with a polyvinylpyrrolidone (polymer B)), prepared by solution polymerization of the polyacrylate, addition of the polyvinylpyrrolidone, and removal of the solvent by distillation.

Polymer A) is composed of

| | |
|---|---|
| 94.7% by weight | n-butyl acrylate (BA) |
| 5% by weight | acrylic acid (AA) |
| 0.3% by weight | photoinitiator (P) |
| | of the above formula I |
| K value 45.8 | |

Polymer B) was composed exclusively of N-vinylpyrrolidone;

K value=17

The weight ratio of A) to B) was 90:10.

Pressure Sensitive Adhesive 2 (PSA2)

Polymer C) was composed of:

| | |
|---|---|
| 84.7% by weight | BA |
| 10% by weight | vinylpyrrolidone (VP) |
| 5% by weight | AA |
| 0.3% by weight | P |
| K value was 47.3. | |

Pressure Sensitive Adhesive 3 (PSA3) (for Comparison)

Polymer C) was composed of:

| | |
|---|---|
| 77.7% by weight | BA |
| 17% by weight | VP |
| 5% by weight | AA |
| 0.3% by weight | P |
| K value was 47.3. | |

The pressure sensitive adhesives PSA1–PSA3 are hotmelt adhesives which are water-free and solvent-free.

Performance Testing

The pressure sensitive adhesives PSA1–PSA3 were coated with an application rate of 60 g/m$^2$ onto polyester film (Hostaphan RN 36), placed on a conveyor belt, and irradiated with 10 mJ/cm$^2$ (UV-C$^2$ radiation).

This was followed by measurements of the peel strength (adhesion) and shear strength (cohesion).

The PSA-coated backing was cut into test strips 25 mm wide. To determine the shear strength the test strips were bonded with an area of 25 mm$^2$ to a chromed V2A stainless steel test plate, rolled on once with a 1 kg roller, stored for 10 minutes (under standard conditions, 50% relative humidity, 1 bar, 23° C.), and then loaded in suspended form with a 1 kg weight (under standard conditions). The measure of the shear strength was the time taken for the weight to fall off; in each case the average from 5 measurements was calculated.

For determining the peel strength (adhesion) a 2.5 cm wide test strip was bonded to a chromed V2A stainless steel test plate (alternatively to polypropylene film (PP, see table)) and rolled on once with a 1 kg roller. It was then clamped by one end into the upper jaw of a stress/strain testing apparatus. The adhesive strip was pulled from the test area at 300 mm/min at an angle of 180°, i.e., the test strip was bent over and pulled off parallel to the metal test plate, and the force required to do this was measured. The measure of the peel strength was the force, in N/2.5 cm, which resulted as the average value from five measurements.

The peel strength was determined 24 hours after bonding. After this time, the bond strength has developed fully.

TABLE 1

| Adhe-sive | Peel strength N/25 mm steel | | Peel strength N/25 mm 24 h | Shear strength 25 × 25 mm |
|---|---|---|---|---|
| | 1st min | 24 h | PP | steel |
| PSA1 | 11.8 | 20.5 | 5.8 | 98h18' |
| PSA2 | 11.0 | 15.9 | 7.3 | 45h31' |
| PSA3 | 13.6 | 17.9 | 0.5 | 64h31' |

We claim:

1. A pressure sensitive adhesive comprising a mixture of:
   a radiation-crosslinkable polymer A) composed of at least 40% by weight of $C_1$ to $C_{18}$ alkyl (meth)acrylates, and
   a polymer B) composed of at least 20% by weight of vinylpyrrolidone and of less than 40% by weight of $C_1$ to $C_{18}$ alkyl (meth)acrylates,
   wherein the fraction of the polymer B) in the mixture is less than 15% by weight, based on the sum of A)+B).

2. The adhesive as claimed in claim 1, wherein A) is composed of at least 60% by weight of $C_1$ to $C_{18}$ alkyl (meth)acrylates.

3. The adhesive as claimed in claim 1, wherein the amount of polymer B) is at least 2% by weight, based on the sum of A)+B).

4. An The adhesive as claimed in claim 1, wherein polymer A) is prepared by emulsion polymerization and is present in the form of an aqueous dispersion.

5. An adhesive as claimed in claim 1, wherein polymer A) is prepared by solution polymerization in an organic solvent.

6. An adhesive as claimed in claim 1, wherein polymers A) and B) have a Fikentscher K value of not more than 80 as determined in a 1% strength solution, in tetrahydrofuran solvent, at 21° C.

7. An adhesive as claimed in claim 1, comprising a photoinitiator.

8. The adhesive as claimed in claim 7, wherein the photoinitiator is attached to the polymer A).

9. The adhesive as claimed in claim 1, wherein polymer B) is added to the aqueous dispersion of polymer A).

10. The adhesive as claimed in claim 1, wherein polymer B) is added to the organic solution of polymer A) and then the solvent is removed.

11. The adhesive as claimed in claim 1, wherein the amount of water and organic solvents in the adhesive is less than 5 parts by weight per 100 parts by weight of the sum of A) and B).

12. The adhesive as claimed in claim 1, which is a hotmelt adhesive.

13. The adhesive as claimed in claim 1, wherein each of polymer A) and B) is comprised of at least one other monomer selected from the group consisting of vinyl esters of carboxylic acids containing up to 20 carbon atoms, vinylaromatic compounds having up to 20 carbon atoms, ethylenically unsaturated nitriles, vinyl halides, vinyl ethers of alcohols containing from 1 to 10 carbon atoms and 1 or 2 double bonds and mixtures thereof.

14. A method of producing a self-adhesive article, which comprises:
   drying the adhesive as claimed in claim 1 as applied to a substrate; and
   cross-linking the polymer molecules of the adhesive by exposure to UV light.

15. The method according to claim 14, wherein the self-adhesive article is a label, adhesive tape or film.

16. A self-adhesive article prepared by the method as claimed in claim 14.

17. A self-adhesive article coated with an adhesive as claimed in claim 1.

* * * * *